(No Model.)

G. W. THISSELL.
CODDLING MOTH TRAP AND TREE PROTECTOR.

No. 333,265. Patented Dec. 29, 1885.

Witnesses;
Geo. H. Strong.
J. H. Towne

Inventor,
Geo. W. Thissell
By
Dewey & Co.
Attorneys

UNITED STATES PATENT OFFICE.

GEORGE W. THISSELL, OF WINTERS, CALIFORNIA.

CODDLING-MOTH TRAP AND TREE-PROTECTOR.

SPECIFICATION forming part of Letters Patent No. 333,265, dated December 29, 1885.

Application filed September 4, 1885. Serial No. 176,206. (No model.)

*To all whom it may concern:*

Be it known that I, GEORGE W. THISSELL, of Winters, Yolo county, State of California, have invented an Improvement in Coddling-Moth Traps and Tree-Protectors; and I hereby declare the following to be a full, clear, and exact description of the same.

My invention relates to the class of insect-traps or tree-protectors which are so constructed as to encircle the tree, and are provided with apertures through which the insect in its larval state passes, and when developed cannot return; and my invention consists in an annular casing or ring perforated over its entire surface and encircling the trunk or branches of the tree independent of and above the ground and forming a chamber around them; in one or more layers of fabric wound around the tree or branch within the casing, and in a seal of wax or other substance at the bottom and top of the casing. This class of traps is illustrated in the patents heretofore granted to me, numbered 265,718, dated October 10, 1882, and 275,093, dated April 3, 1883; and my present invention is an improvement upon those traps.

Trees and shrubbery are subject to the ravages of insects known as "coddling-moth," and other *Lepidoptera.* The coddling-moth, while injurious to various fruit-trees and shrubs, is more especially so to apple and pear trees.

In order to illustrate more fully my invention, I will describe the manner of attack of this moth. When in a perfect form or moth it stings the fruit and lays its eggs therein. These eggs in due time hatch into larvæ or caterpillars, which destroy the fruit, and, eating their way out, drop upon the ground or make their way down the trunk of the tree in search of a place to hide. This place they seek for in the bark of the tree, and they then weave their cocoons, in which they lie in their chrysalis state as pupæ. Finally, developing into a perfect insect or moth, they fly off to other fruit, and the operation is repeated. My former traps were particularly adapted to catch the insects as they sought the tree from the ground or below. My present invention, in addition to being simpler and cheaper in construction, is adapted to catch those insects which come from above, generally down the trunk of the tree, as well as those which come from below.

Figure 1:
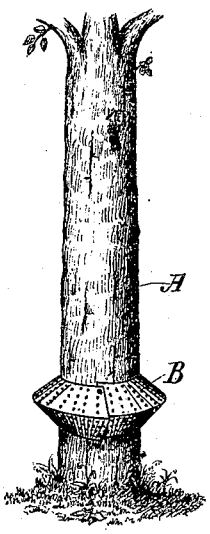
Figure 2:
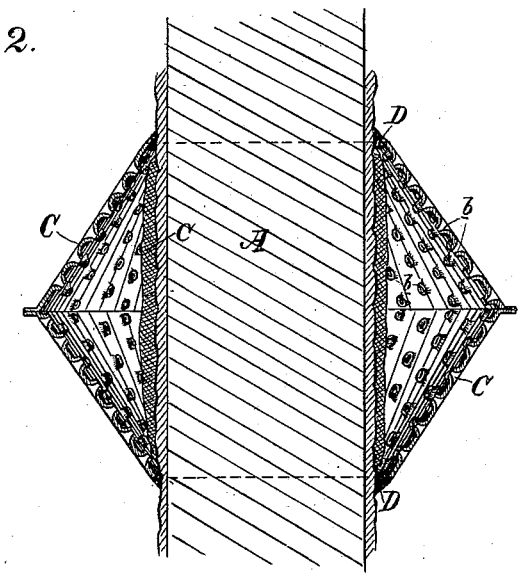

Referring to the accompanying drawings, Figure 1 is a perspective view showing the trap in position. Fig. 2 is a vertical section of the trap and trunk of the tree to which it is applied.

A is the trunk of a tree. B is an annular casing or ring, preferably made of metal, which surrounds the tree, forming a chamber, its bottom and top tightly embracing it.

A practical way of making the casing is to sever its ends and adapt it to spring around the tree, with its ends overlapping, when a tack may be used to secure them. This casing in cross-section is preferably of a double conical shape, as shown, whereby less material is used. The casing is perforated over its entire surface both above and below, though for convenience in manufacture a small central space might be left unperforated. Around the tree is wound one or more folds of fabric, C, such as gunny-sacks are made of. This fabric is inclosed by the casing. The top and bottom of the casing are sealed by suitable wax, D, such as is ordinarily used in grafting.

The operation of the trap is as follows: The larvæ, seeking hiding places to escape from the ravages of the birds and insects, enter through the perforations of the casing. They prefer to get as near the bark as possible, and finding the folds of fabric around the trunk they secrete themselves in it, and spin their cocoons, in due course of time passing through the chrysalis state and developing into moths. As larvæ they do not wish to leave the trap; but as moths they cannot escape, because the holes through which they enter as larvæ are too small to permit their egress as moths. They soon perish and without laying any eggs, as they only lay them in the fruit.

In my former patents I mentioned the placing of cotton and old rags within the trap to provide places in which the insects can secrete themselves. I have found that cotton is not good for this purpose, nor is the indiscriminate arrangement of the old rags; but I find that the wrapping of the tree with the fabric is a much better inducement for them. The holes, by being made all over the surface of the casing, provide for the entrapping of those which come from above as well as those which approach from below, while the double conical shape, which I prefer, affords sufficient capacity of chamber within and an accessible approach from without.

It will be observed that my trap is placed at any point above the ground without touching it or being embedded in it, as is usually done where cylinders of wire-gauze are used. This gives me the advantage of having a bottom for my trap, and also allows the larvæ to come in contact with the tree before reaching the trap, which they are more likely to enter after being on the tree. The wax seal at the bottom and the top of the casing prevents them from getting out at those points.

The trap is more easily arranged and is more effective in its operation than those which I have heretofore patented.

It will be observed that in making the holes or perforations in the casing a burr, $b$, is left on the inner surface. This is of material importance to the success of the trap, as it effectually prevents any egress of the larvæ, even if they were disposed to return.

Having thus described my invention, what I claim as new, and desire to secure by Letters Patent, is—

1. An insect-trap for protecting trees, shrubs, &c., consisting of an annular casing or ring, B, encircling the trunk of the tree or shrub above and independent of the ground and forming a chamber around it, the top and bottom being closed, and said casing having perforations over its entire surface, substantially as herein described.

2. An insect-trap for protecting trees, shrubs, &c., consisting of an annular casing or ring, B, encircling the trunk of the tree or shrub and forming a chamber around it closed at top and bottom, said casing being perforated so as to leave burrs $b$ on the inner surface of the holes, substantially as herein described.

3. An insect-trap for protecting trees, shrubs, &c., consisting of the annular casing or ring B, perforated over its entire surface and encircling the trunk of the tree or shrub, forming a chamber with a closed top and bottom, and the folds of fabric D around the tree within the casing, substantially as herein described.

4. An insect-trap for protecting trees, shrubs, &c., consisting of the annular casing or ring B, perforated over its entire surface and encircling the trunk of the tree or shrub and forming a chamber around it, and the wax seal D at the top and bottom of the casing, substantially as herein described.

5. An insect trap for protecting trees, shrubs, &c., consisting of the annular casing or ring B, made of a double conical shape in cross-section and perforated over its surface, as described, said casing encircling the trunk of the tree or shrub, forming a tight chamber around it, substantially as herein described.

6. An insect-trap for protecting trees, shrubs, &c., consisting of the annular casing or ring B, perforated over its entire surface and encircling the tree or shrub, as described, the folds of fabric C around the tree within the casing, and the wax seal D at the top and bottom of the casing, substantially as herein described.

In witness whereof I have hereunto set my hand.

GEORGE W. THISSELL.

Witnesses:
GEO. H. HAMILTON,
HENRY CRANER.